United States Patent [19]
Lefkow

[11] Patent Number: 5,492,070
[45] Date of Patent: Feb. 20, 1996

[54] PLANTING TOOL AND METHOD OF USING SAME

[76] Inventor: Allan Lefkow, 536 Valley West Ct., West Des Moines, Iowa 50265

[21] Appl. No.: 152,528

[22] Filed: Nov. 16, 1993

[51] Int. Cl.⁶ .................................................. A01C 5/02
[52] U.S. Cl. ................................ 111/115; 111/98; 111/99
[58] Field of Search ............................... 111/115, 89, 92, 111/99, 114, 117, 98; 294/60

[56] References Cited

U.S. PATENT DOCUMENTS

| | | | |
|---|---|---|---|
| 385,324 | 6/1888 | Seller | 111/99 |
| 467,433 | 1/1892 | Prieshoff | 111/99 |
| 1,439,601 | 12/1922 | Boop | 111/92 |
| 1,554,062 | 9/1925 | Zelenski | 111/99 |
| 1,564,721 | 12/1925 | Tallon | 111/99 |
| 2,044,871 | 6/1936 | Beasley | 111/99 |
| 2,257,528 | 9/1941 | Kimble | 111/99 |
| 3,221,681 | 12/1965 | Snyder et al. | 111/115 |
| 3,306,239 | 2/1967 | Martin, Jr. | 111/115 |
| 3,566,814 | 3/1971 | Pelton | 111/99 |
| 3,797,417 | 3/1974 | Hahn | 111/115 |
| 4,082,048 | 4/1978 | Grundström et al. | 111/115 |
| 4,932,339 | 6/1990 | List | 111/92 X |
| 4,995,327 | 2/1991 | Jeffers, Sr. | 111/92 X |
| 5,080,027 | 1/1992 | Brothers | 111/115 X |
| 5,325,798 | 7/1994 | Nowell et al. | 111/92 X |

FOREIGN PATENT DOCUMENTS

| | | | |
|---|---|---|---|
| 320677 | 4/1920 | Germany | 111/99 |
| 2854923 | 7/1979 | Germany | 111/115 |
| 616642 | 1/1949 | United Kingdom | 111/99 |

*Primary Examiner*—Randolph A. Reese
*Assistant Examiner*—Christopher J. Novosad
*Attorney, Agent, or Firm*—Zarley, McKee, Thomte, Voorhees & Sease

[57] ABSTRACT

The method of planting potted nursery plants includes providing a planting tool having a punch head corresponding to the shape of the potted plant to be planted and then inserting the punch head into the ground and displacing soil for forming a cavity having the shape of the punch head and potting soil of the potted plant. The potted plant is then inserted into the sized hole in the ground without the need of any filling soil around the plant. The planting tool includes a cross member having a handle extending from an upwardly extending arm and the punch head extending from the downwardly extending arm. A step member extends through oppositely extending horizontal arms and telescopically holds a measuring member. T shaped holders are provided on the handle for holding punch heads of different sizes and shapes.

6 Claims, 3 Drawing Sheets

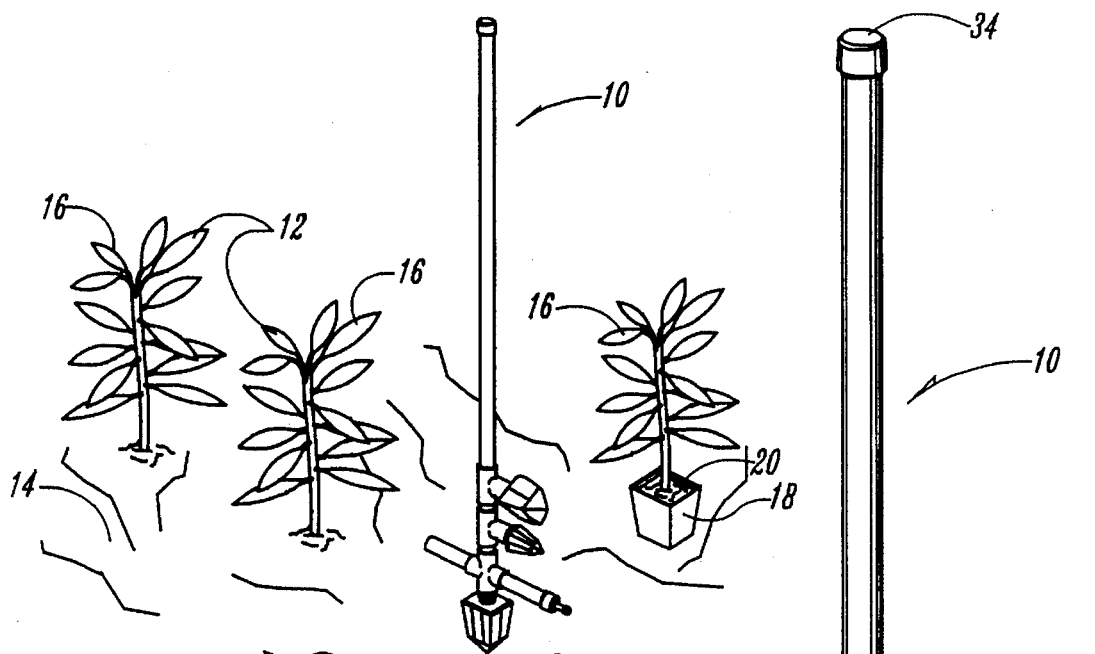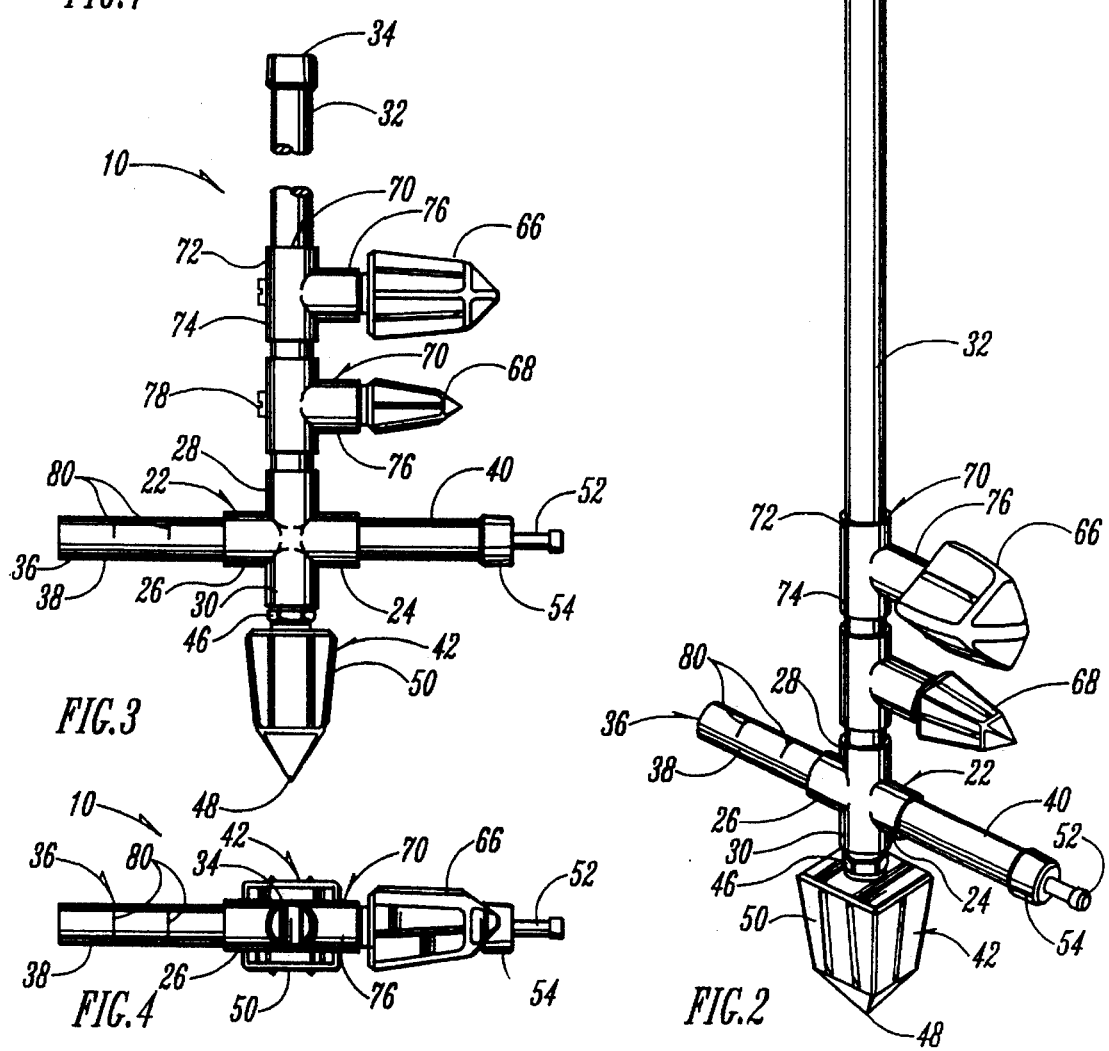

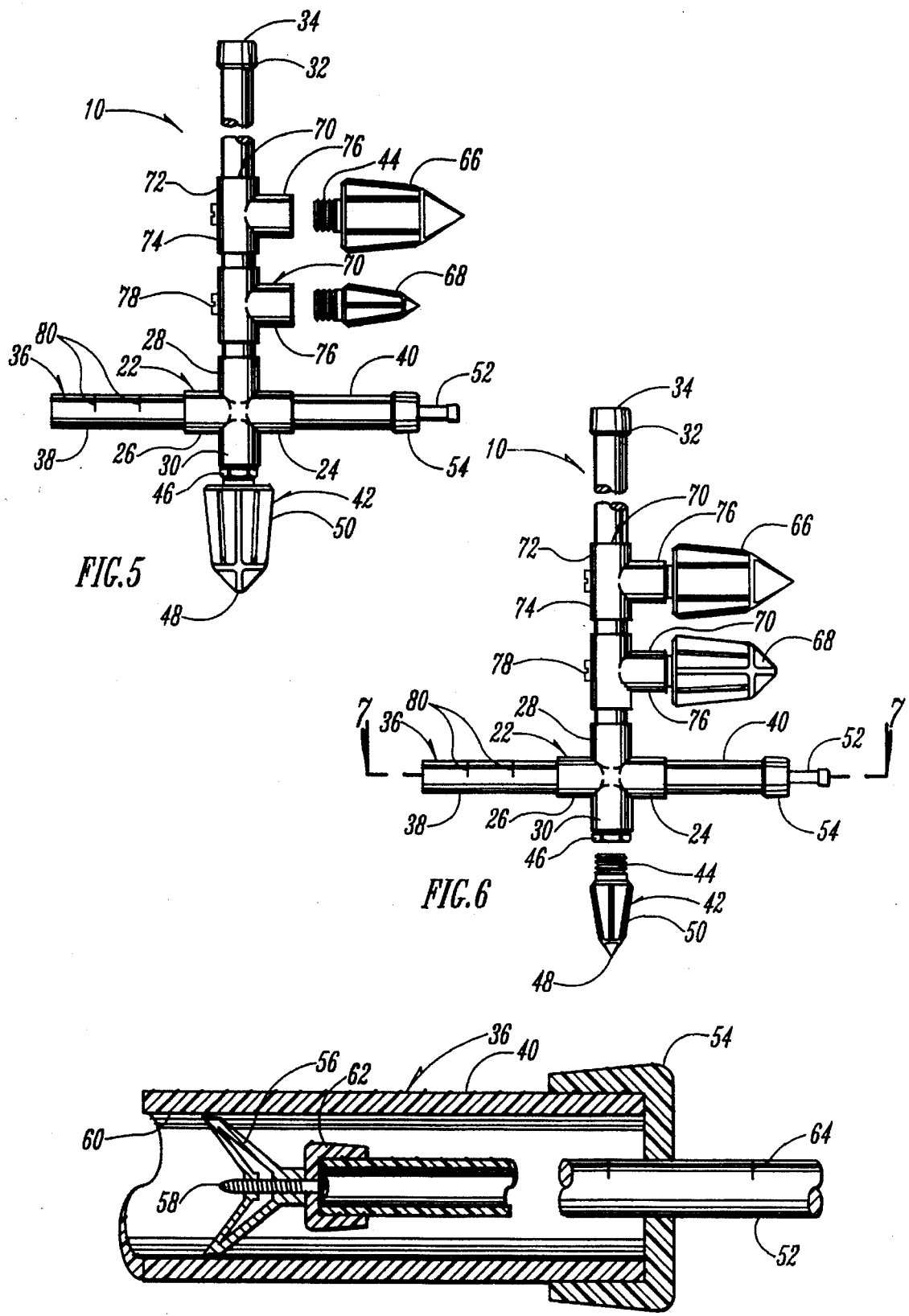

PLANTING TOOL AND METHOD OF USING SAME

BACKGROUND OF THE INVENTION

Bedding plants obtained from nurseries come in difference sizes, requiring forming correspondingly different size holes in the ground for the plants when being transplanted. A planting tool is thus needed that makes it possible to efficiently form planting holes in the ground for plants in flats or pots, having all shapes.

SUMMARY OF THE INVENTION

The planting tool of this invention has a punch head shaped to correspond to the shape of the soil on the plant removed from the flat or pot. The plant thus will stand perfectly straight and not require any filling in and around the potted soil since the hole in the ground has been shaped to correspond exactly to the shape of the potted soil when removed from its transport container.

The planting tool carries on it a plurality of planting punch heads which can be interchanged as needed through manual operation of screw threads.

The planting tool is easily and inexpensively constructed, but is durable in use. It includes a cross member having oppositely extending horizontal and vertical arms. An elongated handle is received in the upwardly extending vertical arm while the punch head is screwed into the downwardly extending arm. A step member extends through the oppositely extending horizontal arms and serves to strengthen the tool throughout, as well as provide a step on either side for pressing the punch into the ground. A measuring member is telescopically received in the hollow step member and may be extended for positioning and spacing plants. An expandable anchor is connected to the inner end of the measuring member and frictionally engages the inside wall of the step member for holding the measuring member in any desired position.

A plurality of T shaped members are provided and include oppositely extending vertical arm portions and a horizontal arm portion. The elongated handle extends through the vertical arm portions and punch heads of different shapes are removably connected to the horizontal arm portions. Thus, a punch head having the desired size and shape is readily available for being interchanged with the punch head being used at any given time.

DESCRIPTION OF THE DRAWINGS

FIG. 1 is a perspective view of a garden showing the planting tool of this invention with a potted plant ready to be transplanted into the ground with other plants that have been previously planted.

FIG. 2 is an enlarged perspective view of the planting tool.

FIG. 3 is a fragmentary side elevational view thereof.

FIG. 4 is a top plan view thereof.

FIG. 5 is a view similar to FIG. 3, but showing the punch heads removably attached to the T shaped holders on the handle.

FIG. 6 is a view similar to FIG. 5, but showing the punch head on the tool in a position to be used being removably attached.

FIG. 7 is a cross sectional view taken along line 7—7 in FIG. 6.

DESCRIPTION OF THE PREFERRED EMBODIMENT

Figure 8:
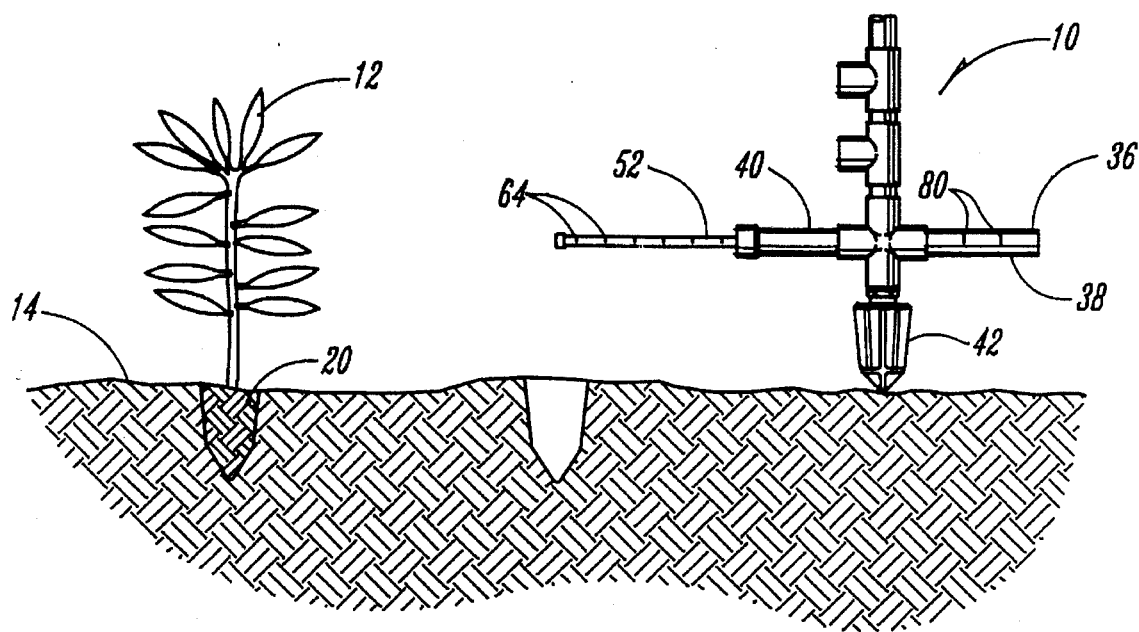
FIG. 8 is a cross sectional view of the garden illustrating the method of using the tool, including the extendable measuring element.
Figure 9:
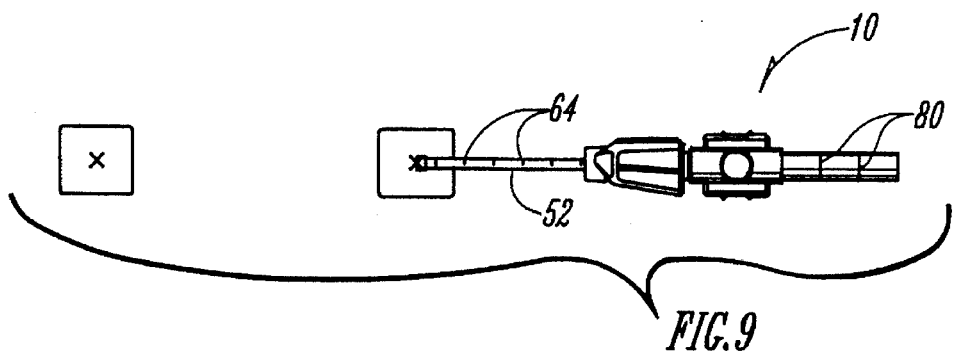
FIG. 9 is a top plan view thereof.

The planting tool of this invention is referred to generally by the reference numeral 10 in FIG. 1. It is seen with plants 12 that have been planted in the ground 14. A plant 16 is shown in a container 18 with potted soil 20 ready to be transplanted into a cavity to be formed in the ground by the planting tool 10.

The tool 10 includes a cross member 22 having oppositely extending hollow horizontal arm portions 24 and 26 and upwardly and downwardly extending arm portions 28 and 30. An elongated handle pipe member 32 is cemented into the upwardly extending arm portion 28 that includes a removable cap 34. A hollow elongated step member 36 extends through the oppositely extending arms 24 and 26 and provides oppositely disposed step portions 38 and 40. The step member 36 also serves to rigidify the entire planting tool.

A punch head 42 includes screw threads as seen in FIG. 6, which engage a threaded iron pipe adapter 46 cemented into downwardly extending arm 30. The punch head 42 has a pointed end 48 and tapered sides 50 which correspond to the sides and shape of the plant container 18, and thus, in turn, the shape of the potted soil 20.

An extendable measuring member 52 is telescopically received in the step member 36 and extends outwardly from the step portion 40 through an end cap 54, as seen in FIG. 7. The measuring member 52 includes an expandable anchor 54 having legs 56 adjustably expanded by a screw 58 for engaging the inside wall 60 of the step member 36. A screw 58 extends through a cap 62 mounted on the inner end of the measuring member 52. Measuring indicia 64 are provided along the length of the measuring member 52 for the desired spacing of plants as seen in FIG. 8. The expandable anchor 54 will frictionally hold the measuring member at any desired extended or contracted position.

Punch heads 66 and 68 having different sizes and shapes are mounted on the planting tool 10 by T shaped holders 70. The holder 70 has upwardly and downwardly oppositely extending arm portions 72 and 74 through which the handle member 32 is slidably received. Additional holders 70 may be added to the handle 32 by removing the cap 34 and sliding them on. A horizontal arm portion 76 threadably holds the optional punch heads 66 and 68. Screws 78 lock the T shaped holders to the handle member 32.

It is seen that the cross member 22, handle member 32, step member 36 and T shaped holder 70 are all made from polyvinyl chloride (pvc) material. The handle length is preferably three feet with the step having a length of approximately one foot.

In use, the punch heads of different shapes and sizes are stored on the handle 32 with the punch head being used for a particular job being threadably attached to the cross member 22. A determination is made as to the shape of the potted soil of the plant 16 to be planted and then a punch head corresponding to that shape is selected and mounted on the lower end of the tool 10. During use, the punch heads 66 and 68 would be removed but returned when the tool is being stored. If the ground is hard, requiring additional pressure on the punch head 42, the user can apply foot pressure to either step portion 38 or 40. Precise spacing of the plants as seen in FIG. 8 may be accomplished by extending the measuring member 52 to the desired length for the spacing required. When not in use, the measuring member 52 is telescoptically contracted into the step member 36. Measuring indicia 80 in two inch increments are also included on the step portion 38.

I claim:

1. A method of planting potted nursery plants, comprising the steps of, providing a planting tool having a lower end and a plurality of head holders on the tool holding a plurality of punch heads having different shapes, selecting the punch head having the shape which corresponds to the shape of the potted plant to be planted and attaching it to the lower end of the planting tool, providing a potted plant having potting soil having the shape of its pot, inserting the punch head into the ground and displacing soil for forming a cavity having the shape of the tool head and the potted plant to be planted, removing the plant with its potting soil from the pot, orienting the plant and its potting soil relative to the ground cavity, and inserting the plant and its potting soil into the ground cavity whereby the plant and potting soil substantially fill the cavity and correspond to the soil displaced by the planting tool head.

2. The method of claim 1 and the step of providing a planting tool includes the step of providing a cross member adjacent to the head at the lower end and providing in the cross member an extendable measuring element, and the further step of extending the measuring element to locate the point where the next cavity is to be formed in the ground to provide a uniform spacing of planted plants.

3. A planting tool comprising, a cross member having hollow oppositely extending horizontal arms and vertical upwardly and downwardly extending arm, a handle member connected to said upwardly extending vertical arm, a punch head removably connected to said downwardly extending arm, a foot step member extending through said oppositely extending horizontal arms providing foot step portions on opposite sides of said cross member, and at least one T shaped member including hollow vertical upwardly and downwardly extending arms and a horizontally extending arm, said handle member slidably extending through said hollow vertical upwardly and downwardly extending arms and a punch head being removably connected to said horizontally extending arm for being selectively interchanged with said punch head on said downwardly extending arm of said cross member.

4. The planting tool of claim 3 and a measuring member is telescopically received in said foot step member and is adapted to be moved between extended and contracted positions for locating and spacing plants at desired distances apart.

5. The planting tool of claim 4 and said step member is hollow and includes an interior wall, and said measuring member includes an expandable anchor means on its inner end which engages the interior wall of said step member to frictionally hold said measuring member in a given position.

6. The planting tool of claim 3 wherein said one T shaped member is one of a plurality of T shaped members and a punch head is removably connected to the horizontally extending arm of each T shaped member.

* * * * *